United States Patent
Greggs

(10) Patent No.: US 9,457,737 B1
(45) Date of Patent: Oct. 4, 2016

(54) VEHICLE NOISE REDUCING ASSEMBLY

(71) Applicant: Nissan North America, Inc., Franklin, TN (US)

(72) Inventor: Alan Greggs, Canton, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 41 days.

(21) Appl. No.: 14/671,777

(22) Filed: Mar. 27, 2015

(51) Int. Cl.
*B60R 13/08* (2006.01)
*B62D 25/08* (2006.01)
*B60R 5/04* (2006.01)
*B60R 13/01* (2006.01)

(52) U.S. Cl.
CPC ............... *B60R 13/08* (2013.01); *B60R 5/04* (2013.01); *B60R 13/011* (2013.01); *B62D 25/087* (2013.01)

(58) Field of Classification Search
CPC .... B62D 25/08; B62D 25/087; B62D 21/17; B60R 13/01; B60R 13/011; B60R 13/0815; B60R 13/083; B60R 13/0846; B60R 13/0853; B60R 13/0884
USPC ........... 296/203.04, 193.08, 208, 39.3, 37.16
See application file for complete search history.

(56) References Cited

U.S. PATENT DOCUMENTS

| | | | | |
|---|---|---|---|---|
| 3,627,373 | A * | 12/1971 | Fox ..................... | B62D 29/002 296/187.02 |
| 3,661,419 | A * | 5/1972 | Mitamura .............. | B60K 15/00 280/834 |
| 4,111,480 | A * | 9/1978 | Breitschwerdt ...... | B62D 25/087 296/208 |
| 6,106,045 | A * | 8/2000 | Gac ........................ | B60R 13/02 296/190.09 |
| 8,844,993 | B1 * | 9/2014 | Engerman ............. | B60R 13/011 296/1.08 |
| 8,939,498 | B2 * | 1/2015 | Fisk ....................... | B60R 13/08 296/193.07 |
| 2011/0101736 | A1 * | 5/2011 | Sogame ............... | B62D 25/087 296/203.04 |

* cited by examiner

*Primary Examiner* — Gregory Blankenship
(74) *Attorney, Agent, or Firm* — Global IP Counselors, LLP

(57) ABSTRACT

A vehicle noise reducing assembly includes a trunk structure having a floor panel, an interior wall panel and an exterior wall panel. A trunk storage area is defined by the interior wall panel and the floor panel. A trim panel is connected to the interior wall panel within the trunk storage area. A cavity is defined by the floor panel, the exterior wall panel and the trim panel and has a first cavity and a second cavity. A relief valve is disposed in a vent opening in the exterior wall panel. The relief valve extends into the first cavity and has a drafter opening facing inboard. A barrier member is disposed in the second cavity with a barrier surface positioned between the relief valve and the second cavity to prevent sound passing through the drafter opening from entering the second cavity.

20 Claims, 8 Drawing Sheets

VEHICLE NOISE REDUCING ASSEMBLY

BACKGROUND

1. Field of the Invention

The present invention generally relates to a vehicle noise reducing assembly. More specifically, the present invention relates to a vehicle noise reducing assembly including a barrier member disposed in a cavity in a trunk storage area to prevent sound passing through a relief valve from entering the cavity.

2. Background Information

A vehicle typically uses a pressure relief valve to relieve air pressure in the vehicle interior. A vehicle heating, ventilation and air conditioning (HVAC) system provides cooled or heated pressurized air to the vehicle interior. The pressure relief valve relieves pressure from the vehicle interior, such as during operation of the HVAC system, to control air flow in the vehicle interior and to maintain the vehicle interior pressure and the atmospheric pressure substantially balanced. For example, a pressure relief valve can be disposed in the trunk storage area to facilitate relieving air pressure in the vehicle interior. However, when air exits through the relief valve, sound can enter through the open relief valve. The entering sound can be undesirable or a distraction to a vehicle passenger. Further, the sound entering the relief valve can be amplified by vehicle structure in the vicinity of the relief valve, thereby increasing the undesirability or distraction factor of the resulting sound.

SUMMARY

In view of the state of the known technology, one aspect of the present invention includes a vehicle noise reducing assembly including a trunk structure having a floor panel, an interior wall panel and an exterior wall panel. A trunk storage area is defined by the interior wall panel and the floor panel. A trim panel is connected to the interior wall panel within the trunk storage area. A cavity is defined by the floor panel, the exterior wall panel and the trim panel and has a first cavity and a second cavity. A relief valve is disposed in a vent opening in the exterior wall panel. The relief valve extends into the first cavity and has a drafter opening facing inboard. A barrier member is disposed in the second cavity with a barrier surface positioned between the relief valve and the second cavity to prevent sound passing through the drafter opening from entering the second cavity.

Another aspect of the present invention includes a vehicle noise reducing assembly including a trunk structure having an interior wall panel, an exterior wall panel and a floor panel. The floor panel has a substantially horizontal floor surface portion and a substantially vertical flange portion. A trunk storage area is defined by the interior wall panel and the floor surface portion of the floor panel. A cavity is defined by the exterior wall panel and the flange portion of the floor panel and is disposed outboard of the trunk storage area. A relief valve is disposed in a vent opening in the exterior wall panel above the cavity and having a drafter opening. A barrier member is disposed in the cavity with a barrier surface positioned between the relief valve and the cavity to prevent sound passing through the drafter opening from entering the cavity.

BRIEF DESCRIPTION OF THE DRAWINGS

Referring now to the attached drawings which form a part of this original disclosure.

DETAILED DESCRIPTION OF EXEMPLARY EMBODIMENTS

Selected exemplary embodiments will now be explained with reference to the drawings. It will be apparent to those skilled in the art from this disclosure that the following descriptions of the exemplary embodiments are provided for illustration only and not for the purpose of limiting the invention as defined by the appended claims and their equivalents.

Figure 1:
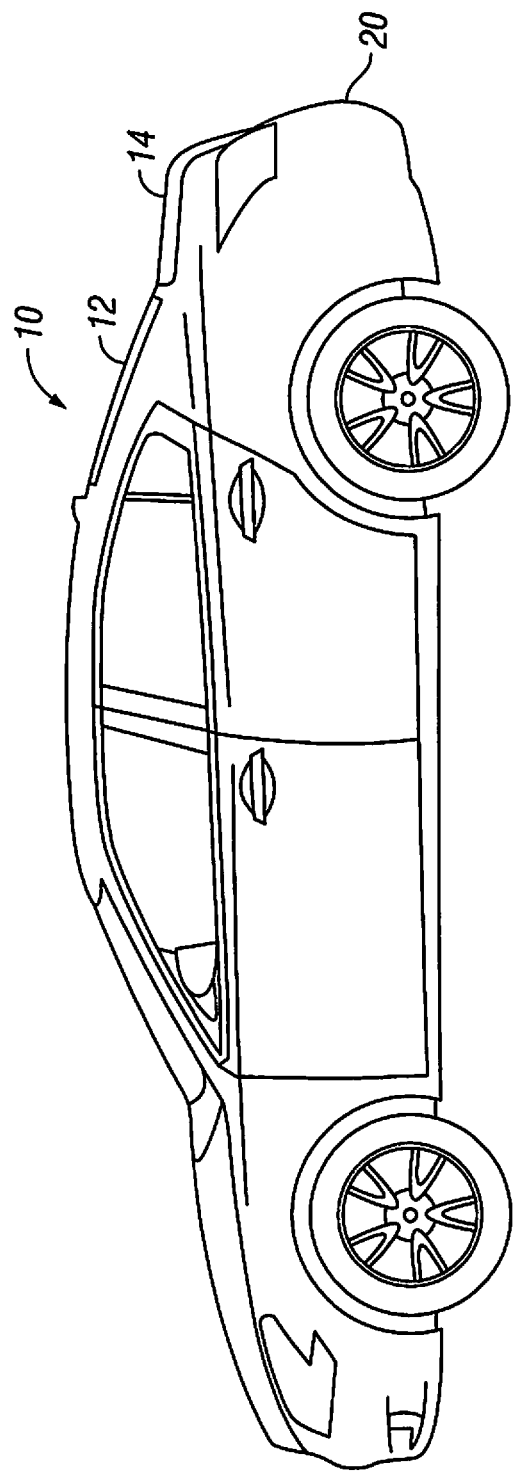
FIG. 1 is a perspective view of a vehicle including a vehicle noise reducing assembly in accordance with an exemplary embodiment of the present invention.
Figure 2:
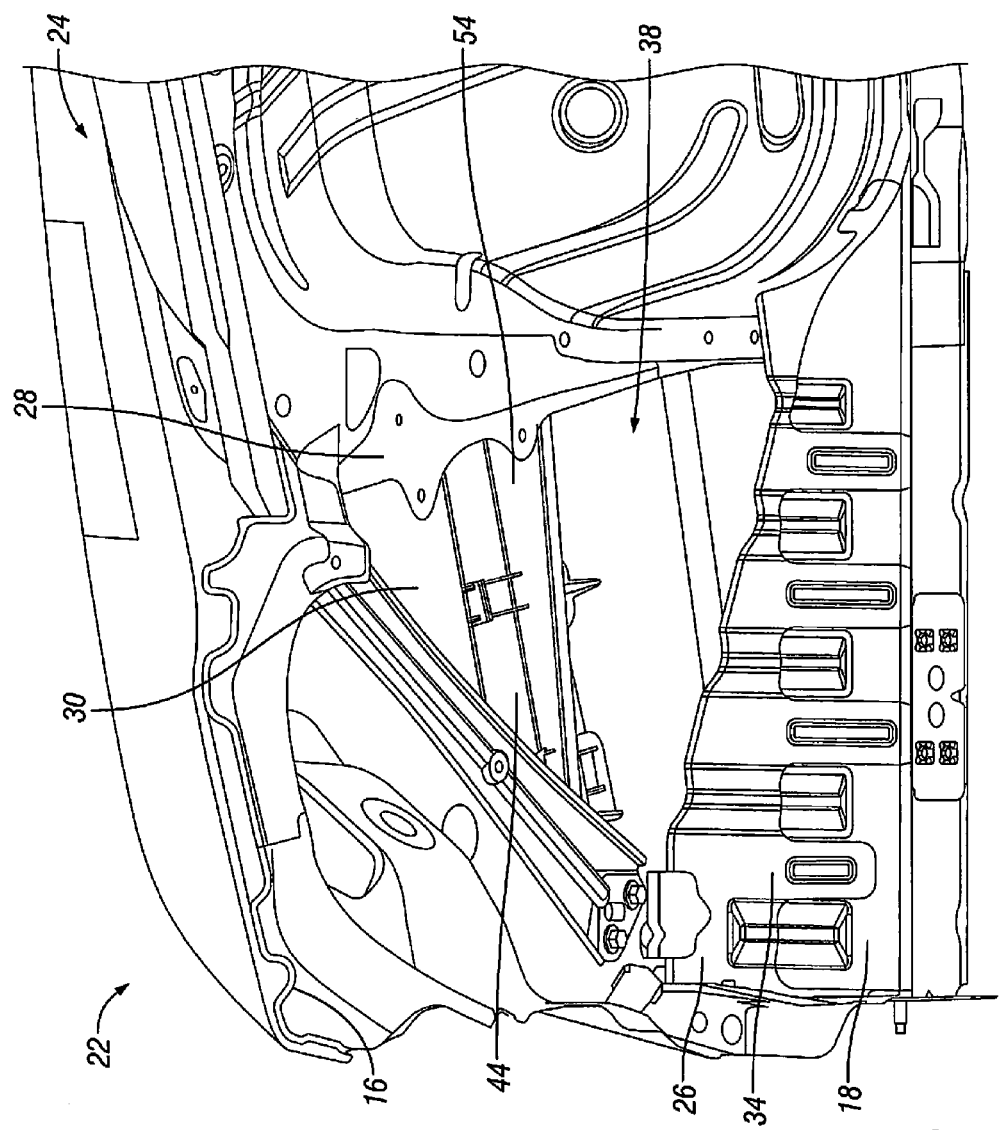
FIG. 2 is a side perspective view of a trunk structure of the vehicle of FIG. 1 in which a pressure relief valve is disposed.
Figure 8:
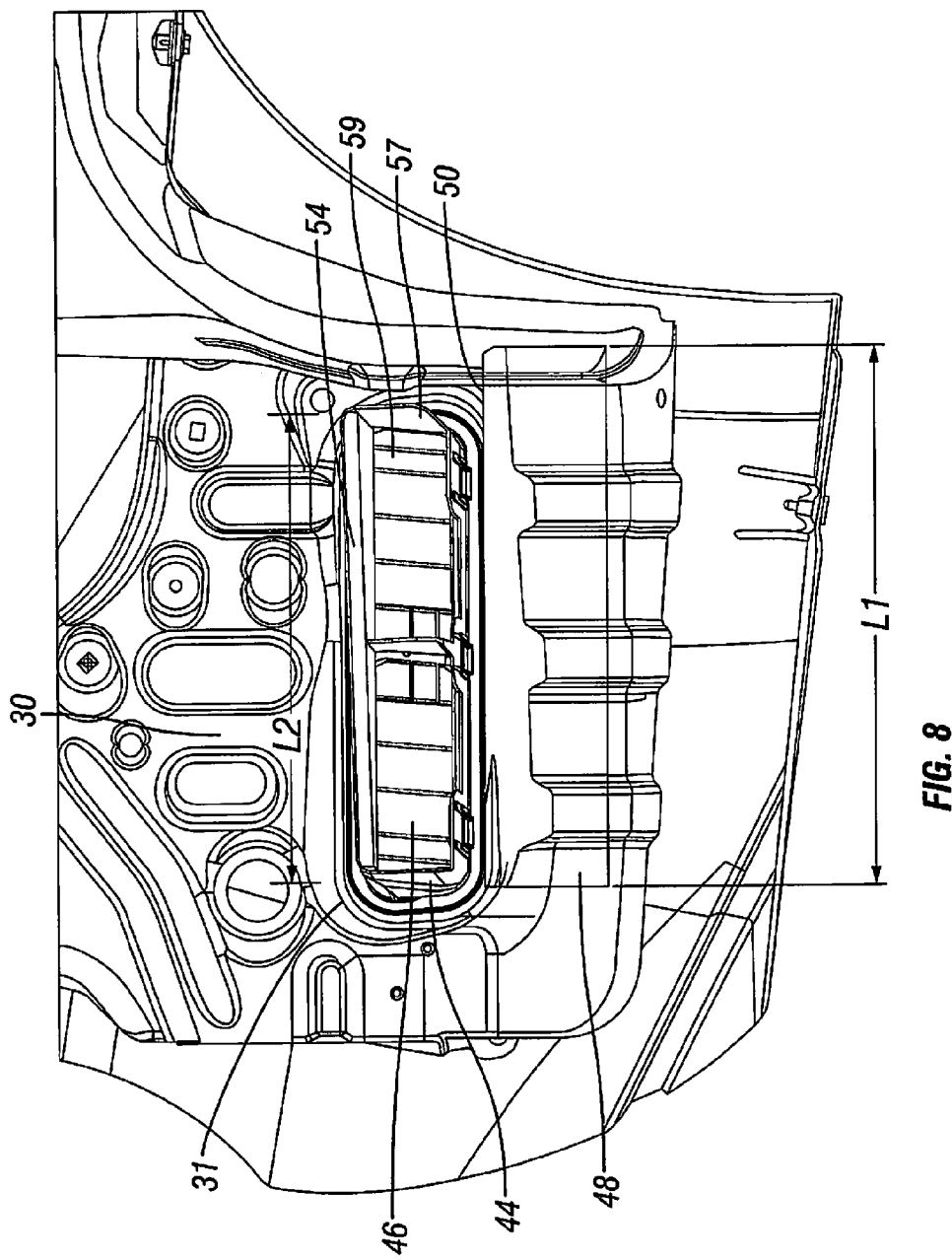
FIG. 8 is a side elevational view in cross section of the trunk structure taken along line 8-8 of FIG. 4.

Referring initially to FIGS. 1, 2 and 8, a vehicle 10 is illustrated in accordance with an exemplary embodiment of the present invention. The vehicle 10 includes, among other features, a vehicle body structure 12 with a trunk lid 14, a trunk opening 16, a trunk storage area 18 and a rear bumper fascia 20. As shown in FIG. 2, the trunk opening 16 exposes the trunk storage area 18 with the trunk lid 14 in an open orientation. The trunk lid 14 is shown in a closed orientation in FIG. 1, but is completely removed from the vehicle 10 in FIG. 2 to provide a view of the trunk storage area 18 within the vehicle body structure 12.

Figure 7:
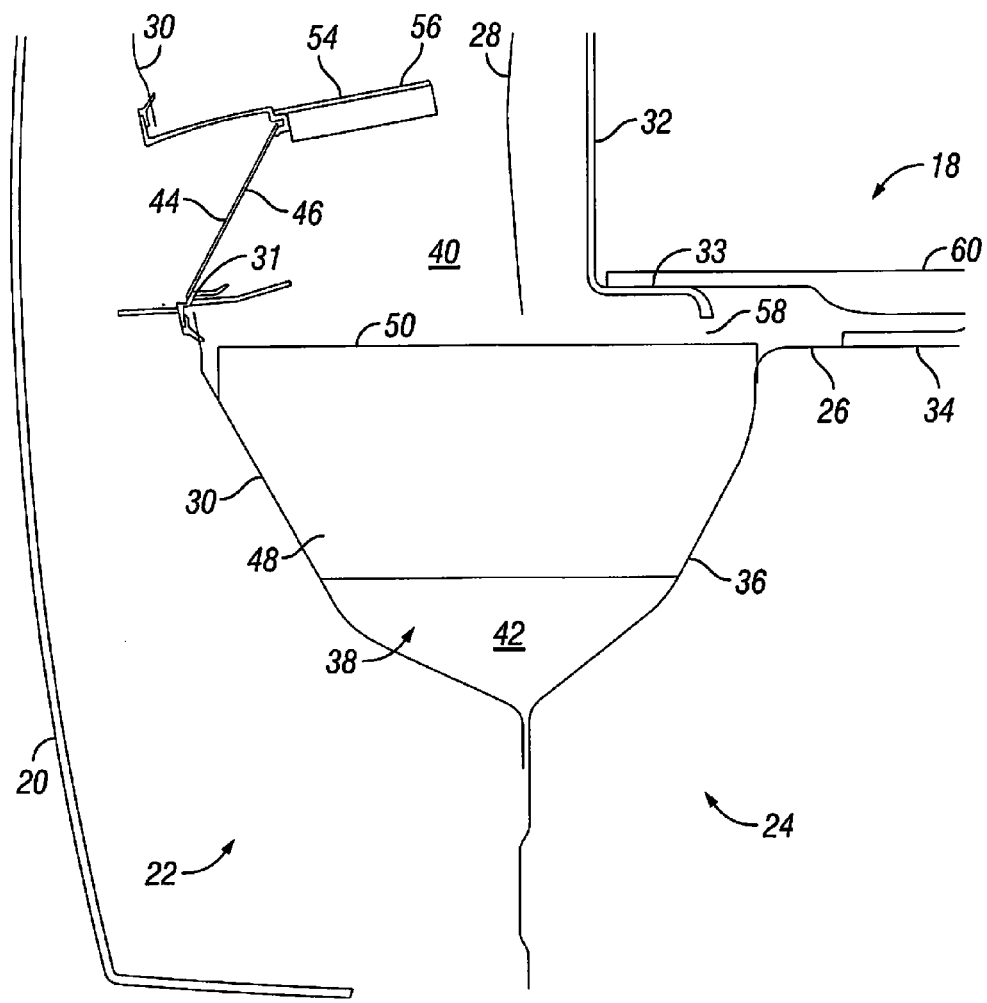
FIG. 7 is a rear elevational view in cross section of the trunk structure taken along line 7-7 of FIG. 6.

A vehicle noise reducing assembly 22 includes, among other features, a trunk structure 24, as shown in FIGS. 2 and 7. The trunk structure 24 includes a floor panel 26, an interior wall panel 28 and an exterior wall panel 30. The floor panel 26 and the interior wall panel 28 define the trunk storage area 18.

The floor panel 26 has a substantially horizontal floor surface portion 34 defining the trunk storage area 18, as shown in FIG. 7. A substantially vertical flange portion 36 extends from an outboard end of the horizontal floor surface portion 34. The vertical flange portion 36 extends downwardly from the outboard end of the horizontal floor surface portion 34.

Figure 3:
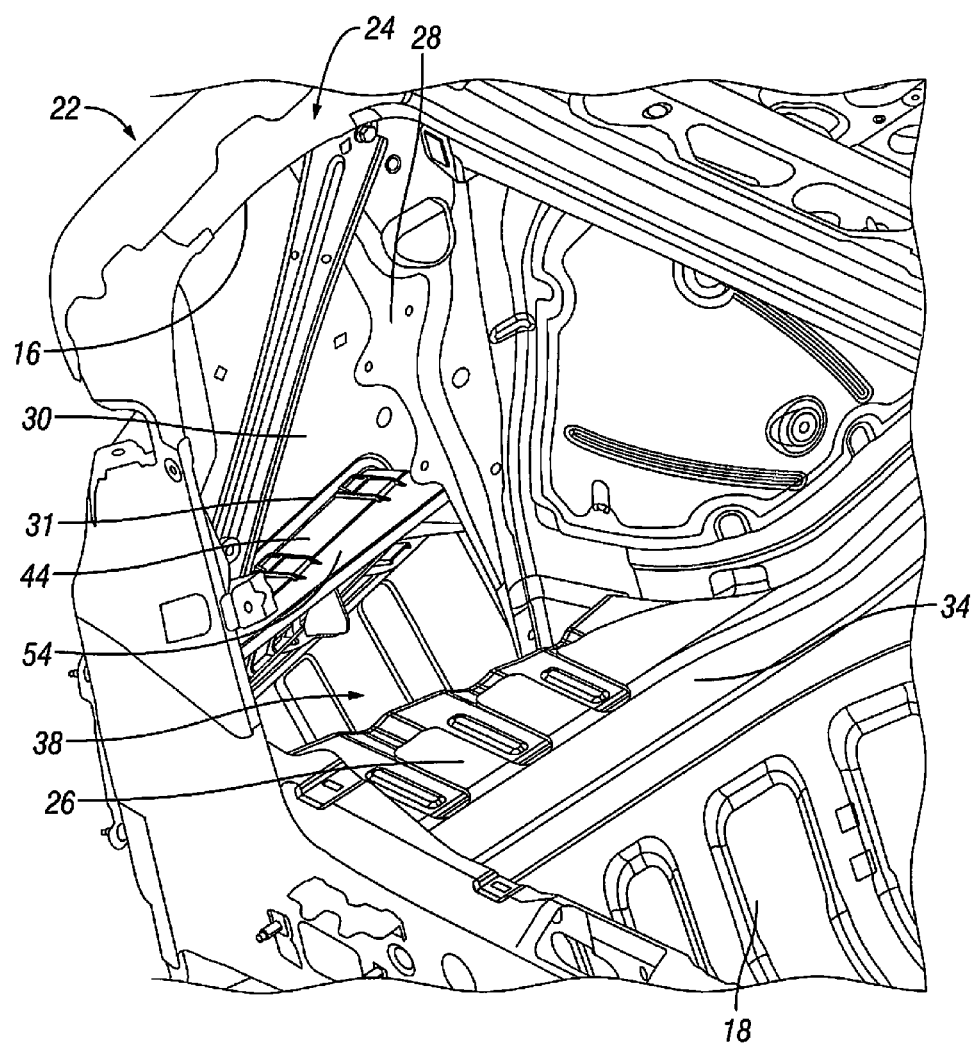
FIG. 3 is a rear perspective view of the trunk structure of FIG. 2 illustrating a cavity therein.
Figure 4:
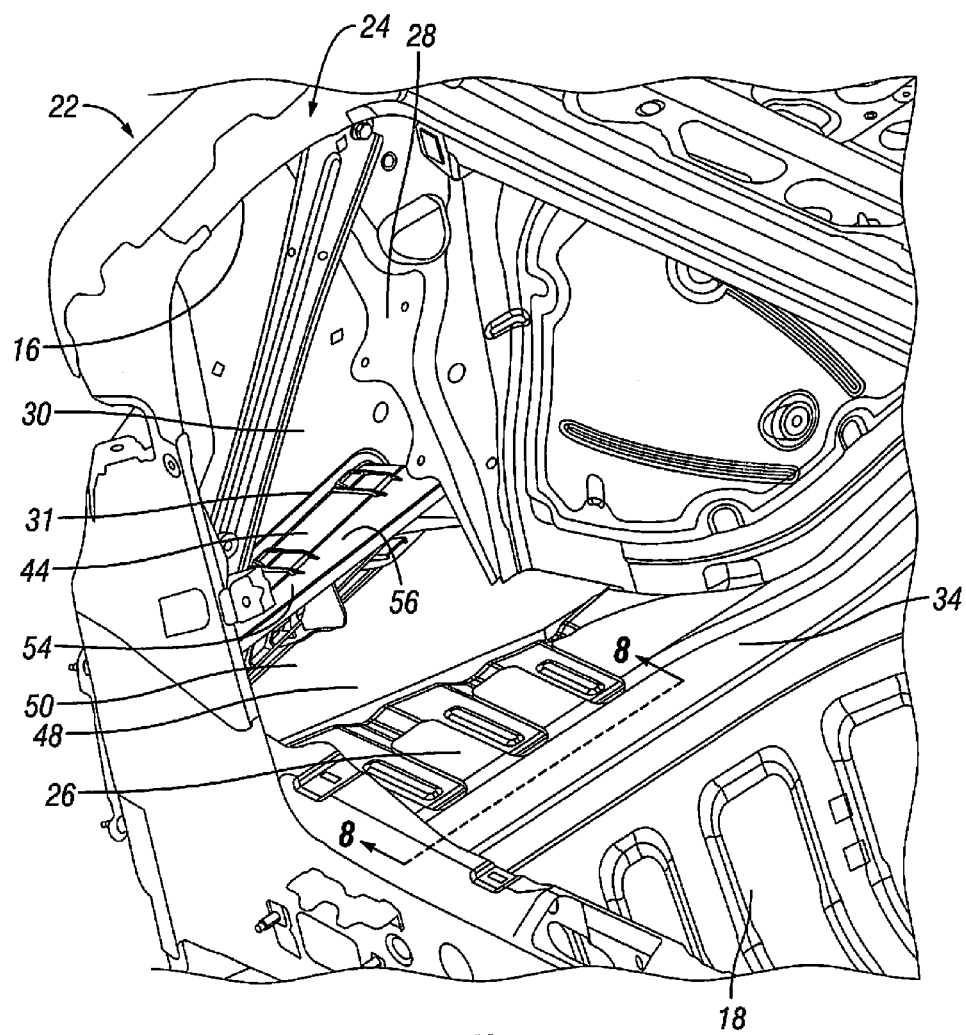
FIG. 4 is a rear perspective view of the trunk structure of FIG. 3 in which a barrier member is disposed in the cavity.

The exterior wall panel 30 is disposed inboard of the rear bumper 20, as shown in FIG. 7. A vent opening 31 is formed in the exterior wall panel 30, as shown in FIGS. 3 and 7. The vent opening 31 is disposed above the floor panel 26, as shown in FIG. 7. Alternatively, the vent opening 31 can be disposed below the floor panel 26. A relief valve 44, or drafter, is disposed in the vent opening 31 in the exterior wall panel 30, as shown in FIGS. 3, 4, 7 and 8. The relief valve 44 is connected to the exterior wall panel 30 in any suitable manner.

The interior wall panel 28 is disposed inboard of the rear bumper fascia 20 and the exterior wall panel 30, as shown in FIG. 7. The interior wall panel 28 is disposed inboard of the relief valve 44 disposed in the vent opening 31 in the exterior wall panel 30.

Figure 5:
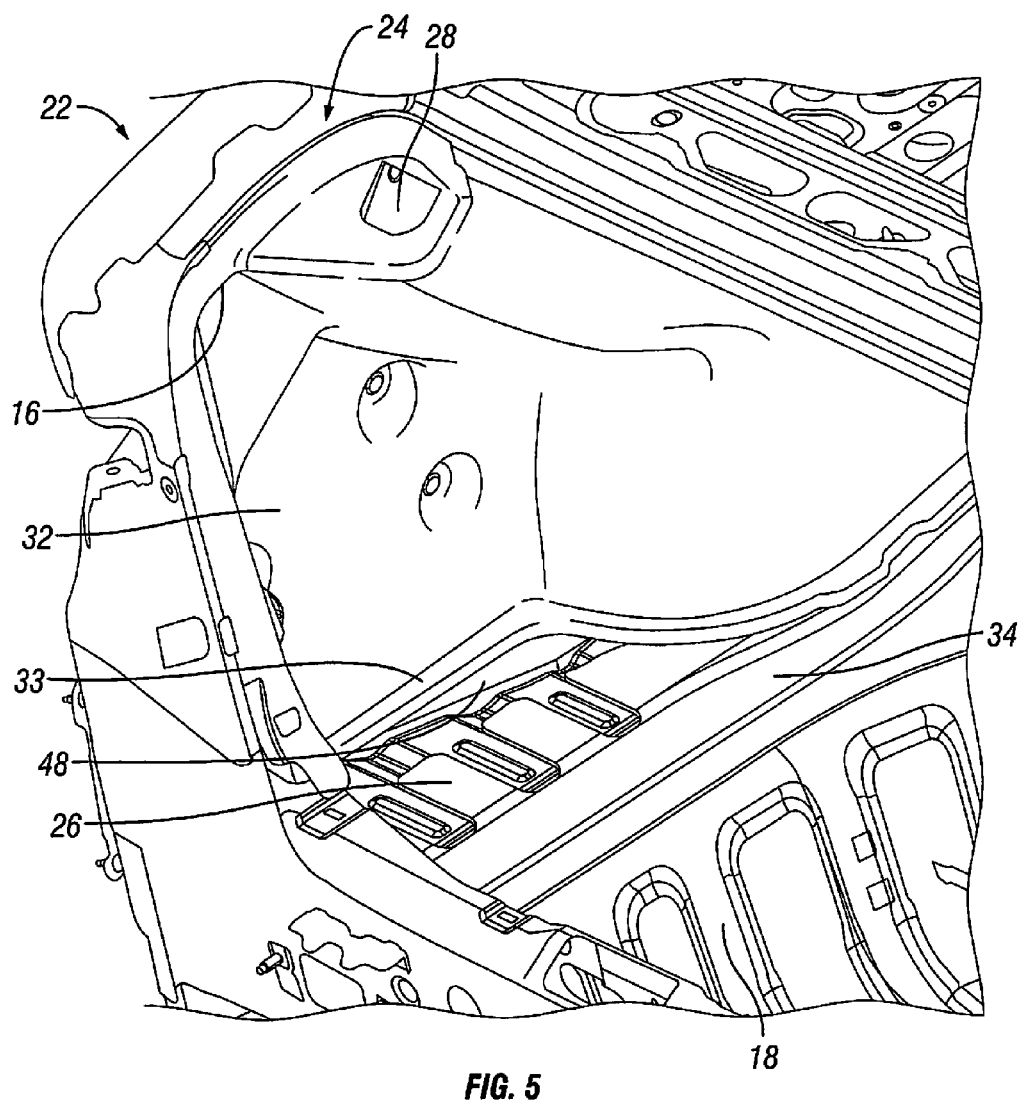
FIG. 5 is a rear perspective view of the trunk structure of FIG. 4 in which a trim panel is disposed in the trunk storage area.
Figure 6:
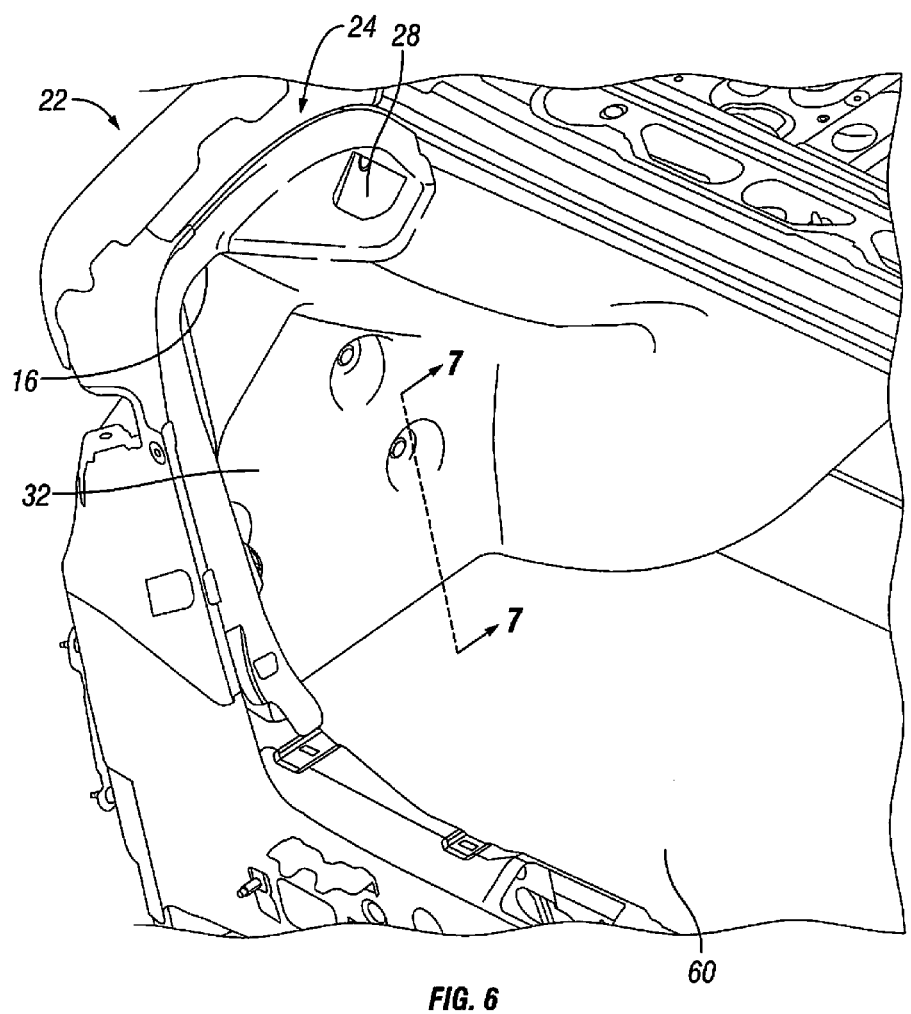
FIG. 6 is a rear perspective view of the trunk structure of FIG. 5 in which a floor covering is disposed in the trunk storage area.

A trim panel 32 is connected to the interior wall panel 28 within the trunk storage area 18, as shown in FIGS. 5 and 6. The trim panel 32 is disposed inboard of the rear bumper fascia 20, the exterior wall panel 30 and the interior wall panel 28. The trim panel 32 includes an inwardly extending lip 33, as shown in FIGS. 5-7.

An outboard cavity 38 is defined by the floor panel 26, the exterior wall panel 30 and the trim panel 32, as shown in FIG. 7. The outboard cavity 38 is shown portioned into a first cavity 40 and a second cavity 42 in communication with the first cavity 40. The first cavity 40 is disposed above the second cavity 42 and above the floor panel 26, as shown in FIG. 7. The exterior wall panel 30 and the trim panel 32 generally define the first cavity 40. The substantially vertical flange portion 36 of the floor panel 26 and the exterior wall panel 30 generally define the second cavity 42, as shown in FIG. 7.

The relief valve 44, or drafter, is disposed in the vent opening 31 in the exterior wall panel 30, as shown in FIGS. 3, 4, 7 and 8. The relief valve 44 is connected to the exterior wall panel 30 in any suitable manner. The relief valve 44 extends into the first cavity 40 and has a drafter opening 46 facing inboard. The relief valve 44 connects the trunk storage area 18 with an exterior of the vehicle to allow air to pass from the trunk storage area 18 to the exterior of the vehicle, thereby controlling the air pressure within the vehicle. Air exits through the drafter opening 46 in the relief valve 44. Any suitable closing member, such as a flapper, can be disposed in the relief valve 44 to close the drafter opening 46. When the valve closing member is moved to a position in which the drafter opening 46 is open to allow air to exit, sound can enter through the open drafter opening 46 such that sound generated externally of the vehicle interior is transmitted through the drafter opening 46 into the vehicle interior.

A barrier member 48 is disposed in the second cavity 42, as shown in FIGS. 4, 5, 7 and 8. A barrier surface 50 of the barrier member 48 is positioned between the relief valve 44 and the second cavity 42 to prevent sound passing through the drafter opening 46 from entering the second cavity 42. In the absence of the barrier member 48, the panels defining the second cavity 42 act as an amplifier to increase the volume of the sound entering through the drafter opening 46. The barrier member 48 absorbs the sound entering through the drafter opening 46, thereby substantially preventing such undesirable sound from distracting a vehicle passenger.

The barrier surface 50 of the barrier member 48 is preferably disposed lower than the drafter opening 46, as shown in FIGS. 7 and 8. The barrier surface 50 preferably forms a substantially continuous surface with the substantially horizontal floor surface portion 34 of the floor panel 26, as shown in FIG. 7. The barrier member 48 extends across the second cavity 42 from the floor panel 26 to the exterior wall panel 30. The barrier member 48 preferably substantially fills the second cavity 42. The barrier member 48 can have any suitable shape to facilitate substantially filling the second cavity 42. The barrier member 48 is made of any suitable dampening and/or insulating material. For example, the barrier member 48 is an insulating member configured to absorb sound.

A duct 54 can be connected to an inboard side of the relief valve 44, as shown in FIGS. 3, 4, 7 and 8. The duct is connected to the relief valve 44 in any suitable manner, such as by snap fit. The duct 54 directs sound passing through the drafter opening 46 of the relief valve 44 to the barrier member 48. The duct 54 extends in an inboard direction from the relief valve 44 toward the trunk storage area 18. The duct 54 has an upper wall 56 with the drafter opening 46 positioned between the upper wall 56 and the barrier surface 50 of the barrier member 48, as shown in FIG. 7.

The drafter opening 46 is preferably oriented to face the barrier surface 50 of the barrier member 48, as shown in FIGS. 7 and 8. The upper wall 56 and side walls 57 of the duct 54 extends inwardly from the relief valve 44 and define an opening 59 in the duct 54 aligned with the drafter opening 46. The duct opening 59 is preferably oriented to face the barrier surface 50, as shown in FIGS. 7 and 8, thereby directing the sound to the barrier surface 50 to facilitate dampening or absorbing the sound.

A gap 58 is defined between the floor panel 26 and the trim panel 32, as shown in FIG. 7. The barrier member 48 extends into the gap 58 to conceal the second cavity 42 from the trunk storage area 18. By concealing the gap 58 from the trunk storage area 18, items are prevented from falling into the second cavity 42 when a floor covering 60 is removed, for instance, to access a spare tire (not shown) or tools (not shown) stored beneath the floor covering 60. In the absence of the barrier member 48, items can fall through the gap 58 into the cavity 38 and are difficult to remove therefrom. The barrier member 48 conceals the cavity 38 to prevent items from falling through the gap 58 into the cavity 38.

The floor covering 60 is disposed over the floor panel 26. As shown in FIG. 7, the floor covering 60 extends to the trim panel 32, thereby covering the gap 58 when the floor covering 60 is in place. The floor covering 60 is received by the lip 33 of the trim panel 32. The barrier member 48 conceals the second cavity 42 from the trunk storage area 18 when the floor covering 60 is moved away from the floor panel 26. When the floor covering 60 is removed, any dropped items land on the barrier surface 50 such that the items are easily retrievable.

A first length L1 of the barrier member 48 is preferably greater than a second length L2 of the duct 54, as shown in FIG. 8. The first length L1 of the barrier member 48 being longer than the second length L2 of the duct 54 provides a large barrier surface 50 to facilitate absorbing or dampening the sound passing through the duct 54.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle.

The terms of degree such as "substantially", "generally", "about" and "approximately" as used herein mean a reasonable amount of deviation of the modified term such that the end result is not significantly changed.

While only selected exemplary embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the exemplary embodiments according to the present invention are provided for illustration only, and not for the purpose of limiting the invention as defined by the appended claims and their equivalents.

What is claimed is:

1. A vehicle noise reducing assembly, comprising:
   a trunk structure comprising a floor panel, an interior wall panel and an exterior wall panel;
   a trunk storage area defined by the interior wall panel and the floor panel;
   a trim panel connected to the interior wall panel within the trunk storage area;
   an outboard cavity defined by the floor panel, the exterior wall panel and the trim panel and having a first cavity and a second cavity in communication with the first cavity;
   a relief valve disposed in a vent opening in the exterior wall panel, the relief valve extending into the first cavity and having a drafter opening facing inboard; and
   a barrier member disposed in the second cavity with a barrier surface positioned between the relief valve and the second cavity to prevent sound passing through the drafter opening from entering the second cavity.

2. The vehicle noise reducing assembly according to claim 1, wherein
   a gap is defined between the floor panel and the trim panel, and
   the barrier member extends across the gap to conceal the second cavity from the trunk storage area.

3. The vehicle noise reducing assembly according to claim 2, further comprising:
   a floor covering disposed over the floor panel and covering the gap, wherein the barrier member conceals the second cavity from the trunk storage area when the floor covering is moved away from the floor panel.

4. The vehicle noise reducing assembly according to claim 1, wherein
   the first cavity is disposed above the second cavity and above the floor panel.

5. The vehicle noise reducing assembly according to claim 1, wherein
   the barrier surface of the barrier member is disposed lower than the drafter opening.

6. The vehicle noise reducing assembly according to claim 1, further comprising:
   a duct connected to the relief valve and extending toward the trunk storage area, the duct having an upper wall with the drafter opening positioned between the upper wall and the barrier surface.

7. The vehicle noise reducing assembly according to claim 6, wherein
   a first length of the barrier member is greater than a second length of the duct.

8. The vehicle noise reducing assembly according to claim 1, wherein
   the barrier member extends across the second cavity from the floor panel to the exterior wall panel.

9. The vehicle noise reducing assembly according to claim 1, wherein
   the floor panel has a substantially horizontal floor surface portion defining the trunk storage area, and a substantially vertical flange portion defining the second cavity.

10. The vehicle noise reducing assembly according to claim 1, wherein
    the barrier surface forms a substantially continuous surface with an upper surface of the floor panel.

11. The vehicle noise reducing assembly according to claim 1, wherein
    the drafter opening is oriented to face the barrier surface.

12. The vehicle noise reducing assembly according to claim 1, wherein
    the barrier member is an insulating member configured to absorb sound.

13. The vehicle noise reducing assembly according to claim 1, wherein
    the barrier member substantially fills the second cavity.

14. A vehicle noise reducing assembly, comprising:
    a trunk structure comprising an interior wall panel, an exterior wall panel and a floor panel, the floor panel having a substantially horizontal floor surface portion and a substantially vertical flange portion;
    a trunk storage area defined by the interior wall panel and the floor surface portion of the floor panel;
    a cavity defined by the exterior wall panel and the flange portion of the floor panel and disposed outboard of the trunk storage area;
    a relief valve disposed in a vent opening in the exterior wall panel above the cavity and having a drafter opening; and
    a barrier member disposed in the cavity with a barrier surface positioned between the relief valve and the cavity to prevent sound passing through the drafter opening from entering the cavity.

15. The vehicle noise reducing assembly according to claim 14, further comprising:
    a trim panel connected to the interior wall panel positioned to conceal the relief valve from the trunk storage area, wherein a gap is defined between the floor panel and the trim panel, and the barrier member extends across the gap to conceal the cavity from the trunk storage area.

16. The vehicle noise reducing assembly according to claim 15, further comprising:
    a floor covering disposed over the floor panel and covering the gap, wherein the barrier member conceals the cavity from the trunk storage area when the floor covering is moved away from the floor panel.

17. The vehicle noise reducing assembly according to claim 14, wherein
    the barrier member extends across the cavity from the floor panel to the exterior wall panel.

18. The vehicle noise reducing assembly according to claim 14, wherein the barrier surface forms a substantially continuous surface with an upper surface of the floor panel.

19. The vehicle noise reducing assembly according to claim 14, wherein
the drafter opening is oriented to face the barrier surface.

20. The vehicle noise reducing assembly according to claim 14, wherein
the barrier member is an insulating member configured to absorb sound and dimensioned to substantially fill the cavity.

* * * * *